(12) United States Patent
Elbert et al.

(10) Patent No.: US 7,549,064 B2
(45) Date of Patent: Jun. 16, 2009

(54) SECURE CIRCUIT ASSEMBLY

(75) Inventors: Arcadi Elbert, Sunnyvale, CA (US); Alvin Diep, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

(21) Appl. No.: 11/125,458

(22) Filed: May 10, 2005

(65) Prior Publication Data
US 2006/0259788 A1 Nov. 16, 2006

(51) Int. Cl.
*G06F 12/14* (2006.01)
(52) U.S. Cl. ...................... 713/194; 340/550
(58) Field of Classification Search .................. 713/194; 726/34; 340/550
See application file for complete search history.

(56) References Cited

U.S. PATENT DOCUMENTS

| | | | |
|---|---|---|---|
| 3,990,069 A | 11/1976 | Schuman | |
| 4,575,610 A | 3/1986 | Gavin | |
| 4,807,284 A | 2/1989 | Kleijne | |
| 4,811,288 A | 3/1989 | Kleijne et al. | |
| 5,159,629 A | 10/1992 | Double et al. | |
| 5,185,717 A | 2/1993 | Mori | |
| 5,309,387 A * | 5/1994 | Mori | 365/52 |
| 5,353,350 A | 10/1994 | Unsworth et al. | |
| 5,596,718 A | 1/1997 | Boebert et al. | |
| 5,790,670 A | 8/1998 | Bramlett | |
| 5,858,500 A * | 1/1999 | MacPherson | 428/68 |
| 6,396,400 B1 | 5/2002 | Epstein, III et al. | |
| 7,015,823 B1 * | 3/2006 | Gillen et al. | 340/652 |
| 7,247,791 B2 * | 7/2007 | Kulpa | 174/50 |
| 7,282,635 B2 * | 10/2007 | Utsunomiya et al. | 136/244 |
| 2002/0002683 A1 * | 1/2002 | Benson et al. | 713/194 |
| 2002/0084090 A1 * | 7/2002 | Farquhar et al. | 174/52.4 |

* cited by examiner

*Primary Examiner*—Nasser G Moazzami
*Assistant Examiner*—Travis Pogmore

(57) ABSTRACT

A secure circuit assembly includes a printed circuit board including first and second surfaces and a secure boundary area in the first surface. A circuit to be protected is located in the secure boundary area. A first inner enclosure is attached to the first surface of the printed circuit board and covers the secure boundary area in the first surface. A first sensor film is attached to the first inner enclosure and is electrically coupled to the printed circuit board. The secure circuit assembly also includes first and second outer enclosures, the first outer enclosure covering the first inner enclosure and the second outer enclosure covering the second inner enclosure. A method for providing security to a circuit assembly is also disclosed.

22 Claims, 3 Drawing Sheets

SECURE CIRCUIT ASSEMBLY

BACKGROUND

Electronic circuits that process sensitive or secret information such as cryptographic modules sometimes are required to meet certain security standards. One such requirement is the Federal Information Standard Publication (FIBS) 140-2 level 4 physical security standard which describes the level of security that needs to be provided to a cryptographic module against unauthorized attempts at physical access. This standard mandates a complete envelope of protection around a cryptographic module with the intent of detecting any unauthorized attempt at physical access to the cryptographic module. If an unauthorized physical access is detected, the design is required to clear or "zeroize" the cryptographic module in order to protect the sensitive information stored therein. Although the cryptographic module may be physically protected by encapsulating the module using potting material, this unfortunately makes the secure circuit assembly that includes the cryptographic module unrepairable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
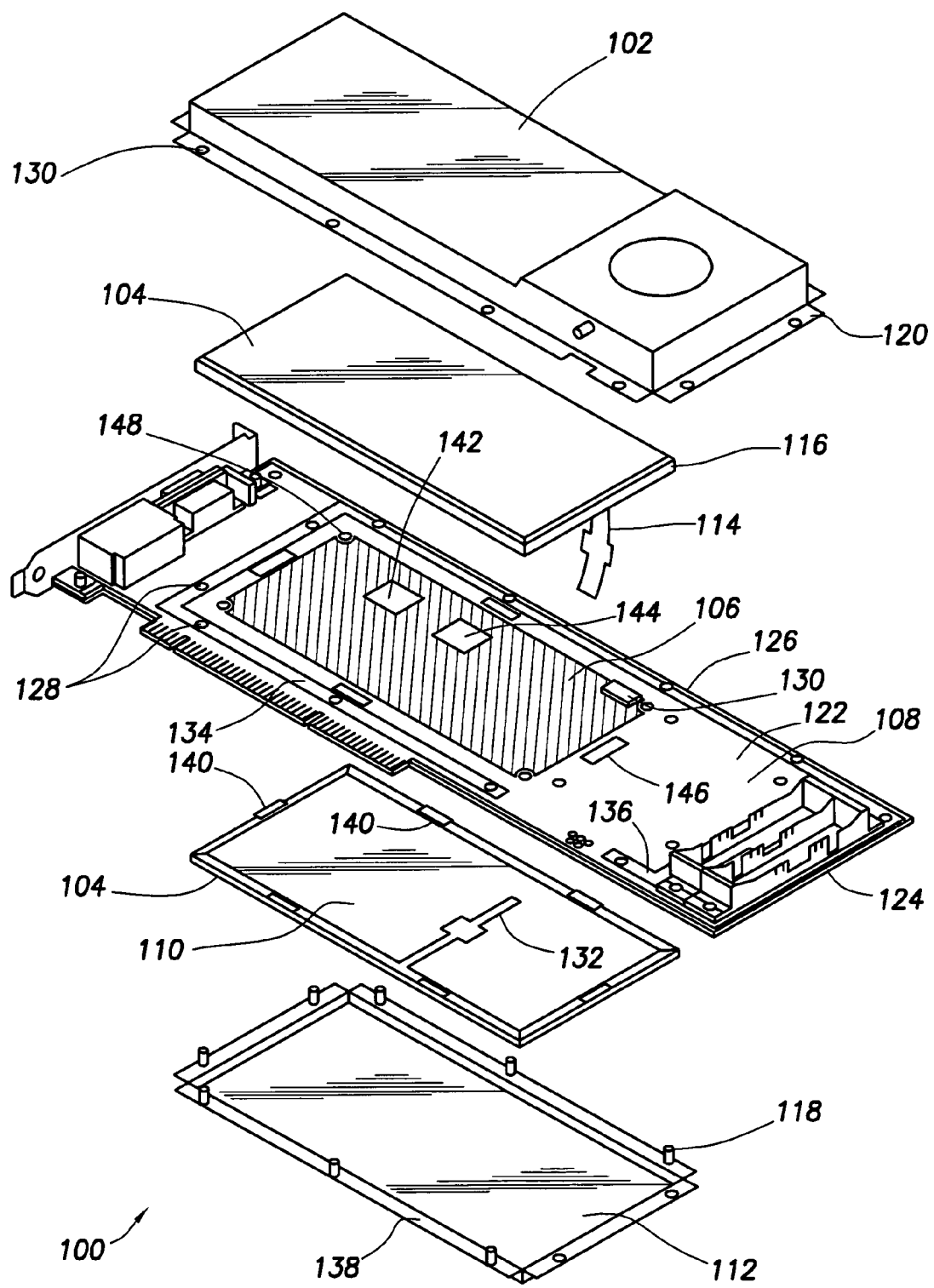
FIG. 1 shows an exploded view of a secure circuit assembly in accordance with an embodiment of the invention.

Referring to FIG. 1, there is shown an exploded view of a secure circuit assembly 100 that comprises a printed circuit board 108 having a first secure boundary area 106 on a first surface 122, and a second secure boundary area 126 on a second surface 124 of the printed circuit board 108. In one embodiment of the invention, the first and second boundary areas 106 and 126 are in substantial alignment with each other on opposite sides of the printed circuit board 108 (also referred to as being in registration with each other). In order to provide full protection to the first secure boundary area 106 as well as the second secure boundary area 126 where, for example, a cryptographic module 142 or other sensitive circuit may be located, a first or top outer enclosure 102 and a second or bottom outer enclosure 112 enclose ("sandwich") the secure boundary areas 106 and 126 when attached to the circuit board 108. The first and second outer enclosures 102, 112 can be formed in an illustrative example from sheet metal or other materials.

Located between the circuit board 108 and the top outer enclosure 102 is a top inner enclosure 116 that is covered with a tamper resistant sensor film 104 that is adhesively or otherwise coupled to the top inner enclosure 116. Located between the main circuit board 108 and the bottom outer enclosure 112 is a bottom inner enclosure 110 that also includes a sensor film 104 that is in one embodiment adhesively or otherwise attached to the bottom inner enclosure 110. Both of the sensor films 104 include a flexible circuit extension 114, 132 that electrically interconnect to corresponding female connectors located within each of the secure boundaries 106 and 126. The connector 130 for the top portion of the assembly is shown. The flexible circuit extensions 114, 132 provide information to a monitoring circuit 144 as to whether certain layers of the sensor films have been penetrated or tampered with.

The top outer enclosure 102 is attached to the bottom outer enclosure 112 using a plurality of fasteners such as threaded studs 118 that are attached to the bottom outer enclosure 112. The threaded studs 118 pass through corresponding apertures 128 located on printed circuit board 108 and corresponding apertures 130 located on the top outer enclosure 102. A set of nuts (not shown) are threaded to the ends of the threaded studs 118 in order to secure both the top 102 and bottom 112 outer enclosures to the printed circuit board 108. The top inner enclosure 116 also includes a set of threaded studs (not shown) that pass through corresponding apertures 148 located on the printed circuit board 108. A set of nuts (not shown) help secure the top inner enclosure 116 to printed circuit board 108. The bottom inner enclosure 110 is pressure fitted against the printed circuit board 108 when the outer enclosures 102 and 112 are attached together. The inner enclosures 116 and 110 provide enough space when pressed against the printed circuit board 108 to allow the electrical components such as circuits 142, 144 that are found within the secure boundary areas 106, 126 to fit within the inner enclosures 116, 110.

The top outer enclosure 102 includes a flanged outer lip 120 that; when the assembly is fully assembled, rests on and makes contact with a conductive trace 134 that is, in at least some embodiments, at ground potential and provides for improved electromagnetic interference (EMI) to the assembly 100. The bottom outer enclosure 112 also includes a lipped outer edge 138 that mates with a corresponding grounding trace.

Both of the inner enclosures 116 and 110 include a plurality of contact pads 140 which mate with corresponding contact pads 146 located on the corresponding surfaces of the printed circuit board 108. The contact pads 140, 146 form an electric continuity loop (security loop) that can be detected by monitoring circuit 144. A break in the electric continuity loop provides security breach information to the monitoring circuit 144. For example, the security breach information may indicate a loss of electrical continuity between two inputs of the monitoring circuit 144. Any attempt to remove or lift up either of the inner enclosures 116 and 110 will cause an electrical break in the corresponding electrical loop which is detected and acted on by the secure monitoring circuit 144.

In one embodiment, the cryptographic module 142 includes the monitoring circuitry required to monitor the different electrical loops of the assembly 100 including the electrical loops formed by the inner enclosures 116, 110 making contact with the printed circuit board 108, as well the electrical loops formed by the tamper resistant film 104. Upon detection of an attempted intrusion, for example, detecting that one of the electrical loops has been caused to become an electrical open circuit, the cryptographic module 142 can cause the protection of any sensitive information stored therein or associated therewith against illegal access, by for example, erasing or clearing out any internal and/or external memory locations, overwriting any memory locations, disabling or causing the cryptographic module 142 to become nonfunctional, etc. In another embodiment, a separate security monitoring circuit 144 is utilized as shown in FIG. 1. If a separate security monitoring circuit 144 is used, the security monitoring circuit 144 upon detection of an attempted intrusion (e.g., detecting security breach information on the form of a electrically open electrical loop) can for example clear out (zeroize) any information such as cryptographic keys and secure data from the cryptographic module 142 or any of the other techniques mentioned previously so that the intruder cannot recover (access or read) the information after breaking into the security assembly 100.

To provide further security along the sides of the security assembly 100, the security boundary areas 106 and 126 are set back (example 0.5 inch) along the edge of the printed circuit board 108. An electrical trace (not shown) which guards the perimeter of the printed circuit board 108 is randomly "stitched" between the layers of the printed circuit board 108 and is located about 0.35 inch from the edge of the printed circuit board 108. Any attempt at drilling through the sides of the assembly will be detected by a break in the electrical trace which in turn is detected by the security monitoring module 144 in one embodiment. As a further measure of security, the printed circuit board 108 comprises a 15 layer board with thin insulation or pre-peg layers. This means that only very small diameter drill bits could be used to penetrate the thin sides of printed circuit board 108. Since the security boundary 106 is set back from the edges of the circuit board by a distance (example 0.5 inch) that is much greater than the thickness of the insulation layers (example 0.0029 inch), any attempt to reach a secure signal trace by drilling through the insulation layers would not be successful.

Figure 2:
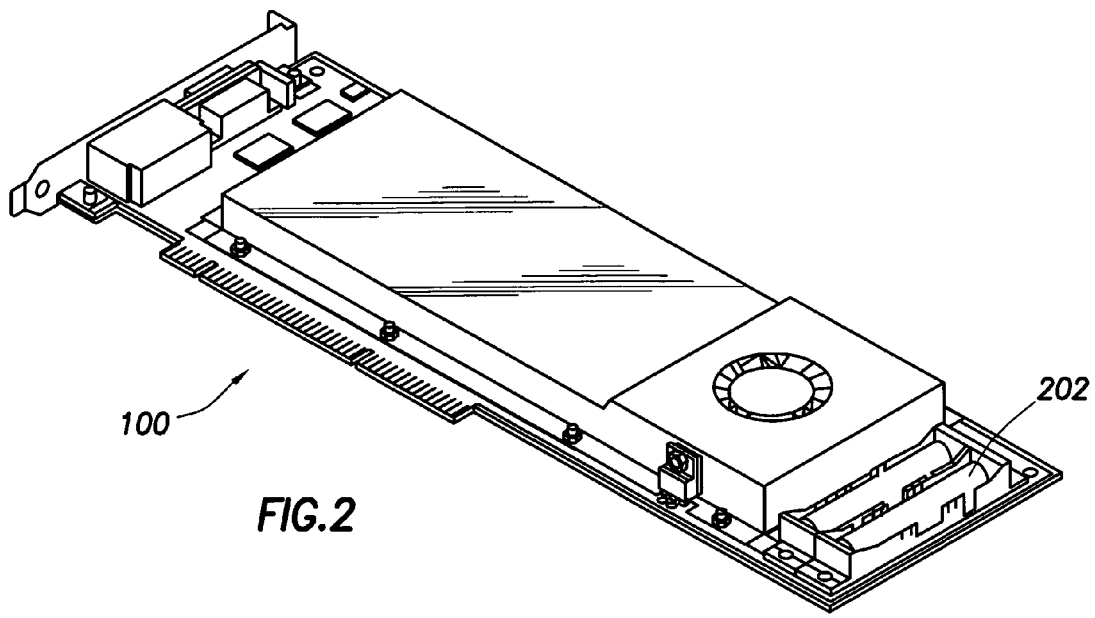
FIG. 2 shows a first or top side of a fully assembled secure circuit assembly in accordance with an embodiment of the invention.
Figure 3:
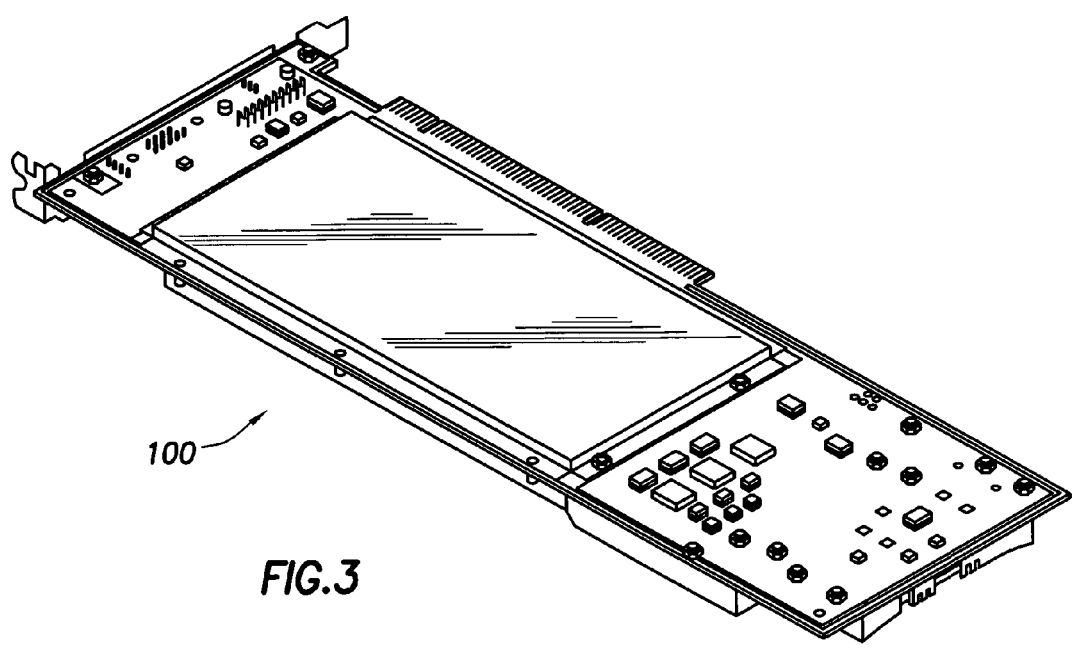
FIG. 3 shows a second or bottom side of the fully assembled secure circuit assembly shown in FIG. 2 in accordance with an embodiment of the invention.

FIG. 2 shows the top side of the secure assembly 100 in a fully assembled state, while FIG. 3 shows the bottom side of the fully assembled secure assembly 100. Batteries 202 (such as rechargeable batteries) are provided as part of the assembly in order to power the security circuitry when the circuit assembly, which in the example shown in FIGS. 2 and 3 is a plug-in card for a computer, is disconnected from the computer or other electronic device.

Figure 4:
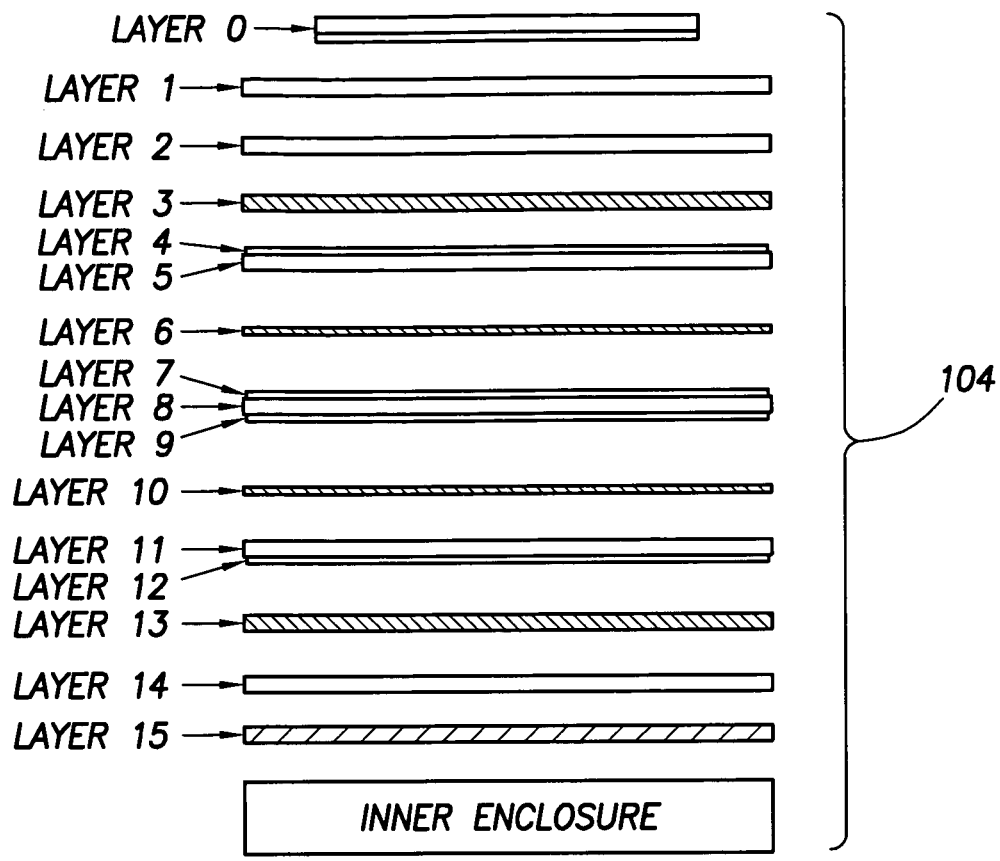
FIG. 4 shows an exploded side view of a multilayer security film in accordance with an embodiment of the invention.

Referring to FIG. 4, there is shown an exploded side view of the sensor film 104 which is also referred to as a tamper resistant sensor film which is mounted on the inner enclosures 116 and 110. The sensor film 104 is a multi-layer film that helps protect the secure areas 106 and 126 from any attempt to access through (example, drill through) the top 116 or bottom 110 inner enclosures.

In one embodiment, the sensor film 104 includes the following layers: layers 0 and 15 are liners which help cover the two outer surfaces of the sensor film 104; layer 1 comprises a thin (example 2 mm thick) opaque mylar layer; layer 2 comprises a thin (example 2 mm thick) adhesive material such as 3M™ 9460 adhesive layer; layer 3 is an electrical insulation layer; layer 4 is a silver ink layer forming a top serpentine pattern which is deposited onto layer 5 and which is a non-poled Poly-Vinylidene Fluoride (PVDF) material; layer 6 is a thin (example 1 millimeter thick) layer of 3M™ 9460 adhesive; layers 7 and 9 are silver ink layers attached to layer 8 on a non-poled PVDF piezo film material; layer 10 is a thin (example 1 mm thick) layer of 3M™ 9460 adhesive layer 11 is another non-poled PVDF layer having deposited to it layer 12 which is a silver ink layer forming a bottom serpentine pattern; layer 13 is an electrical insulation layer and layer 14 is a thin (example 2 mm thick) layer of densil adhesive. Layers 1-14 when laminated together have a nominal thickness (example about 14 millimeters). Layer 15 of the sensor film is adhesively coupled to the top inner 116 and bottom inner 110 enclosures. The type, order and number of layers can be varied. The thicknesses of the layers also can be different from that stated above.

When a drill or other device attempts to penetrate through the sensor film 104, it will cause the top drill plate layer and bottom drill plate layers (layers 7 and 9 discussed below) to become electrically shorted together. The electrical short can occur by the drill bit as it bores into the drill plate causing a portion of one drill plate to make electrical contact with the other drill plate. Also, if an electrically conductive drill bit is used, that will also contribute to an electrical short condition occurring between the drill plates. The electrical short will be carried via flexible circuit 114 to mating connector 130 to the security monitoring circuit 144 via traces on the printed circuit board 108. The security monitoring circuit 144 will cause the circuit that is being protected, such as the cryptographic module 142, to have a portion or all or any sensitive information erased. In another embodiment, the circuit that is being protected can be designed in such a way that it will be destroyed or become nonfunctional.

Any attempt to penetrate through the sensor film 114 (example by attempting to peel off layers or attempting to peel off the sensor film 114 from the top inner enclosure 116 or bottom inner enclosure 110) will break one of the serpentine patterns located on layers 4 or 12 and cause an electrical open circuit that will be detected by the intrusion monitoring circuit 144. The serpentine patterns comprise narrow conductors printed onto the surface of the PVDF film using silver ink. The serpentine patterns are extremely fragile and any attempt to peel the pattern will break the serpentine conductor. The serpentine patters are designed to be as close together as possible, so almost any size drill bit or other tool that may be used to intrude into the security assembly can cause a break in the pattern. The bottom side of the layer 1 opaque mylar layer is electrically conductive foil and is biased to ground potential. Any attempt to inject adhesive dissolving solvent under layer 1 will cause the conductive foil to electrically short to any other conductive layer in the construction. This electrical short will be detected by the security monitoring circuit 144 which will take action and erase any sensitive circuitry located in the secure areas 106 and 126.

Figure 5:
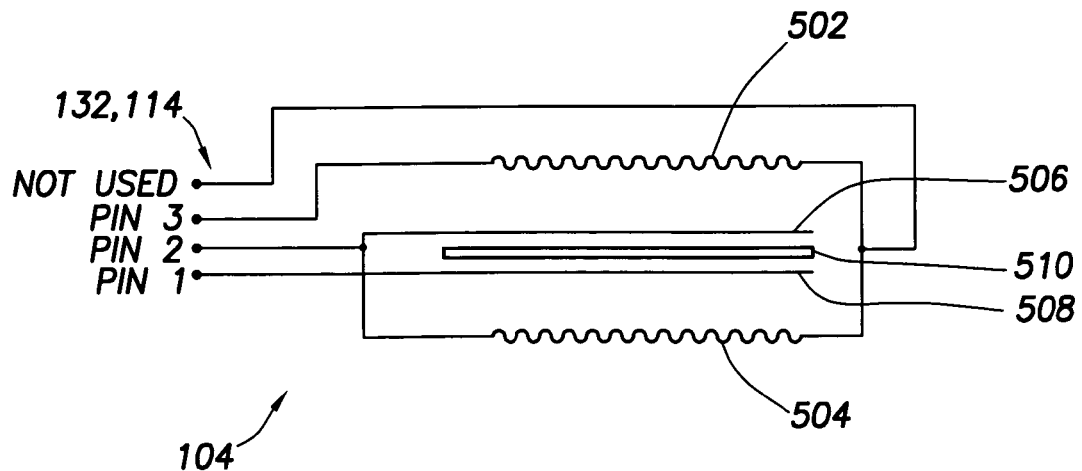
FIG. 5 shows an electrical schematic of the electrical loops found in a sensor film in accordance with an embodiment of the invention.

In FIG. 5, there is shown an electrical representation of the sensor film 104. The top serpentine layer 4 (502) and bottom serpentine layer 12 (504) previously discussed form an electrical loop that is detected at pins 1 and 3 of the flexible circuit 114, 132. The top drill plate layer 7 (506) and bottom drill plate layer 9 (508) are monitored at pins 1 and 2. Any attempt to drill through the sensor film will cause either of the drill plates to electrically short to ground potential 510 which will be detected by the secure monitoring circuit 144 that is monitoring pins 1 and 2.

In some exemplary embodiments, the secure circuit assembly 100 provides a level of security that in at least one embodiment meets the previously mentioned FIPS140-2 level 4 security standard or other standards while allowing for the troubleshooting and repair down to the component level of any circuit located inside of the secure areas 106 and 126.

What is claimed is:

1. A secure circuit assembly comprising:
   a printed circuit board including first and second surfaces and including a secure boundary area in the first surface;
   a circuit to be protected located in the secure boundary area;
   a first inner enclosure attached to the first surface of the printed circuit board and covering the secure boundary area in the first surface;
   a first sensor film attached to the first inner enclosure and electrically coupled to the printed circuit board; and
   first and second outer enclosures, the first outer enclosure covering the first inner enclosure and the second outer enclosure covering a secure boundary area on the second surface.

2. The secure circuit assembly as defined in claim 1, further comprising:
   a second inner enclosure attached to the second surface of the printed circuit board; and
   a second sensor film attached to the second inner enclosure and electrically coupled to the printed circuit board.

3. The secure circuit assembly as defined in claim 2, wherein the first and second sensor films comprise a multilayer film including one or more layers including conductive ink.

4. The secure circuit assembly as defined in claim 1, wherein the first and second outer enclosures are attached to each other and configured to enclose the secure boundary area located on the printed circuit board.

5. The secure circuit assembly as defined in claim 2, wherein the first and second sensor films include at least one serpentine electrical trace configured to prevent the first and second sensor films from being peeled off from their corresponding inner enclosures.

6. The secure circuit assembly as defined in claim 1, wherein the first and second outer enclosures each include a lip extending from a perimeter, the lip coupling to grounding traces located on the printed circuit board and configured to provide electrical magnetic interference (EMI) suppression.

7. The secure circuit assembly as defined in claim 1, wherein the secure boundary area is located away from edges of the printed circuit board, the printed circuit board includes multiple layers, and a security trace is formed around a perimeter of the secure boundary area about the multiple layers of the printed circuit board.

8. The secure circuit assembly as defined in claim 1, further comprising:
   a secure monitoring circuit located within the secure boundary area.

9. The secure circuit assembly as defined in claim 8, wherein the secure monitoring circuit configured to monitor any attempts of removing the first inner enclosure as well as any attempt to penetrate the first sensor film.

10. The secure circuit assembly as defined in claim 8, further including sensitive information located in the circuit to be protected and wherein the secure monitoring circuit upon the detection of a security breach, causes at least a portion of the sensitive information to be protected against access.

11. The secure circuit assembly as defined in claim 10, wherein the at least a portion of any sensitive information associated with the circuit is protected against at least one selected from the group consisting of: access by an action selected from deletion; erasure; and overwriting.

12. A circuit assembly, comprising:
   a printed circuit board including a secure boundary area and first and second surfaces;
   a secure circuit located within the secure boundary area;
   a secure monitoring circuit coupled to the secure circuit;
   first and second enclosures that enclose the printed circuit board;
   first and second secure films, the first secure film attached to the first enclosure and the second secure film attached to the second enclosure, wherein the first and second secure films provide security breach information to the secure monitoring circuit if either of both of the first and second secure film sections are breached; and
   first and second outer enclosures that are attached to each other and substantially enclose the printed circuit board.

13. The circuit assembly as defined in claim 12, wherein the first and second secure films comprise a multilayer film having first and second drill plate layers.

14. The circuit assembly as defined in claim 12, wherein each of the first and second secure films further comprise two or more serpentine layers which form electrical loop circuits that are monitored by the secure monitoring circuit.

15. The circuit assembly as defined in claim 12, wherein an attempt to remove either of the first or second secure films from the first and second enclosures causes security breach information to be provided to the secure monitoring circuit.

16. The circuit assembly as defined in claim 12, wherein the secure monitoring circuit upon detecting a break in an electrical loop circuit formed by either or both of the first and second secure films causes sensitive information stored in the secure circuit to be erased.

17. The circuit assembly as defined in claim 12, wherein the secure monitoring circuit upon detecting a break in an electrical loop circuit formed by either or both of the first and second secure films causes the secure circuit to become nonfunctional.

18. The circuit assembly as defined in claim 12, wherein the first and second outer enclosures include a lip substantially around their perimeter; and the first and second surfaces of the printed circuit board each include a grounding trace, and when the first and second outer enclosures mate to their respective first and second surfaces on the printed circuit board, the lip and the grounding traces configured to provide electrical magnetic interference shielding to the secure circuit.

19. The circuit assembly as defined in claim 18, wherein the printed circuit board comprises a multilayer printed circuit board and further comprising: a security trace formed about the secure boundary area, the security trace formed through the multiple layers of the printed circuit board and configured to detect any penetration of the sides of the printed circuit board.

20. A secure circuit assembly, the secure circuit assembly comprising:
- a means for supporting a circuit in a secure boundary area;
- a means for enclosing the secure boundary area and for providing security breach information upon detection of a security breach;
- a means for detecting attempts at penetrating through the means for enclosing; and
- a means for electromagnetically shielding the means for enclosing and means for detecting, the means for electromagnetically shielding coupled to the means for supporting.

21. The secure circuit assembly as defined in claim 20, further comprising:
- a means for determining when a security breach occurs in any one of the means for enclosing and the means for detecting.

22. The secure circuit assembly as defined in claim 21, wherein the means for determining, upon detecting a security breach, causes secure information stored in the circuit to be protected, to be protected against access.

* * * * *